(12) United States Patent
Moya et al.

(10) Patent No.: US 6,780,962 B2
(45) Date of Patent: Aug. 24, 2004

(54) (METH)ACRYLIC ESTER BINDERS FROM GLYCOLYZED AROMATIC POLYESTERS

(75) Inventors: Dally Moya, Zürich (CH); Ria De Cooman, Hünenberg (CH); Werner Meyer, Zollikon (CH)

(73) Assignee: Sika Schweiz AG, Zurich (CH)

(*) Notice: Subject to any disclaimer, the term of this patent is extended or adjusted under 35 U.S.C. 154(b) by 0 days.

(21) Appl. No.: 09/917,674

(22) Filed: Jul. 31, 2001

(65) Prior Publication Data

US 2002/0042486 A1 Apr. 11, 2002

(30) Foreign Application Priority Data

Aug. 1, 2000 (EP) ............................................. 00116565

(51) Int. Cl.[7] .............................................. C08G 63/02
(52) U.S. Cl. ....................... 528/272; 528/274; 528/275; 528/278; 528/280; 528/281; 525/437; 525/451; 525/48; 521/48
(58) Field of Search ................................ 528/272, 274, 528/275, 278, 280, 281, 271, 491, 499; 521/48, 48.5; 525/437, 451, 48, 445, 301.5; 524/603, 605

(56) References Cited

U.S. PATENT DOCUMENTS

| 3,194,783 | A | | 7/1965 | Bowen |
| 3,645,984 | A | | 2/1972 | Dowbenko et al. |
| 3,993,629 | A | | 11/1976 | Hasunuma et al. |
| 4,458,006 | A | * | 7/1984 | Donges et al. ............ 430/283.1 |
| 4,735,995 | A | * | 4/1988 | Chettiath .................. 525/301.5 |
| 4,873,281 | A | * | 10/1989 | Maska ......................... 524/457 |
| 4,983,712 | A | * | 1/1991 | Meixner et al. ............. 528/272 |
| 5,008,366 | A | | 4/1991 | Bathe |
| 5,252,615 | A | * | 10/1993 | Rao et al. ...................... 521/48 |
| 5,877,255 | A | * | 3/1999 | Gerber et al. ............. 428/423.1 |

FOREIGN PATENT DOCUMENTS

| EP | 0514147 | | 11/1992 |
| EP | 0558905 | | 9/1993 |
| EP | 1002842 | | 5/2000 |
| JP | 04293932 | * | 10/1992 |
| SU | 390070 | * | 12/1973 |

* cited by examiner

Primary Examiner—Tatyana Zalukaeva
(74) Attorney, Agent, or Firm—Burns, Doane, Swecker & Mathis, L.L.P.

(57) ABSTRACT

Described are methacrylate or acrylate binders e.g. obtainable by the steps of (i) generating OH-precursors from at least one aromatic polyester, and (ii) reacting said OH-precursors of step (i) with methacrylic acid and/or acrylic acid to form a respective ester, whereby step (i) comprises reacting an aromatic polyester, or a mixture of aromatic polyesters with at least one polyol and/or at least one aminopolyol to generate hydroxy terminated oligomers.

Optionally, a modified product can be obtained by performing a further reaction in step (i), namely by reacting said hydroxy terminated oligomer with at least one polycarboxylic acid and/or at least one polycarboxylic anhydride to generate said hydroxy terminated binder precursor oligomer.

26 Claims, No Drawings

(METH)ACRYLIC ESTER BINDERS FROM GLYCOLYZED AROMATIC POLYESTERS

BACKGROUND OF THE INVENTION (1) Field of the Invention

The present invention relates to low-cost (meth)acrylic ester binders and such binder comprising compositions, the synthesis of such binders starting from polyesters such as polyethylene terephthalate (PET), and their application in reactive acrylic systems, particularly in adhesives, coatings and floorings.

(2) Description of the Related Art

The use of polyesters, in particular PET, in film and fiber applications has increased drastically in the past several years. According to the Sherwin-Williams patent U.S. Pat. No. 5,252,615, PET accounted for about 20% by volume of the world's solid waste in 1993. A large amount of scrap and waste materials is still resulting from the production and consumption of PET every year and therefore, processes which can make use of recycled PET are economically interesting. Taking into account that environmental care and ecological balance have a high priority for the chemical industry today, the conversion of PET waste and scraps into usable raw materials is a continuous challenge. Besides reducing waste, the use of recycled plastics contributes also to the ecological compatibility of commercial products.

Several methods have been developed for converting PET into aromatic polyester polyols, which are valuable, and low-cost raw materials for the production of adhesive, coating and flooring compositions.

Adhesives, coatings and floorings have to fulfill several requirements in order to be considered for industrial applications. Preferably, the compositions should combine a long open time with a fast curing speed. The cured systems should exhibit good mechanical and adhesive properties, besides high weather and chemical resistance. However, not only the technical requirements but also the economical aspects determine the choice of adhesives, coatings and floorings for industrial applications. The price of a composition depends mainly on the costs of its reactive components, therefore, it is important to reduce the costs of said reactive components as much as possible. Processes, which make use of inexpensive starting materials such as PET, allow the production of low-cost components for adhesives, coatings and flooring compositions.

For industrial applications of such compositions, high speed in curing, especially at room temperature, is advantageous, particularly in manufacturing operations where it is expensive to wait until the systems are fully cured. Consequently, compositions with a high curing speed and enough long open time to allow application are desired. One class of systems, which can be adapted more readily to fit these requirements, is the class of polymerizable acrylate based systems. Acrylic compositions that cure according to a free radical polymerization mechanism reach final strength within minutes at room temperature. This fast strength build-up confers acrylic compositions advantages in comparison to compositions based on epoxies and urethanes which need several hours to reach the same grade of strength.

Methyl methacrylate (MMA) is the most widely used monomer in radically curing acrylic systems. Despite the low cost and excellent properties of this monomer, its strong and disagreeable smell restricts to a great extent its use in adhesive, coating and flooring compositions. All other commercially available low-odor acrylic monomers are expensive, and for that reason novel low-odor/low-cost acrylic monomers, which can be used for acrylic systems, are needed.

Next to the fast curing, acrylic systems are also known for other advantages like high strength and high chemical resistance to acids and alkalines. A disadvantage of the standard acrylic systems is the relatively high shrinkage. Large shrinkage on curing leaves substantial residual stress, which can lead to delamination of a joint. The shrinkage is correlated to the molar mass of the used monomers. For high molar mass oligomers, the relation between the molar mass and the amount of reactive groups is higher, therefore, the shrinkage will be lower. U.S. Pat. No. 3,194,783 describes formulations with high mechanical properties and low shrinkage based on epoxy-acrylates. These oligomers are widely used in compositions for adhesives or floors. But the diacrylate of bisphenol-A diglycidylether is a very high viscous compound, which has to be diluted. The acrylates derived from ethoxylated bisphenol-A diglycidylether have a lower viscosity, but with increasing ethoxylation grade the tensile strength decreases. Moreover, the ethoxylation process is not a simple reaction procedure.

Acrylic compositions, containing cycloaliphatic compounds, with high strength and low shrinkage are described in DE 3 940 138 A1. These cycloaliphatic compounds are unsaturated esters of glycol monodicyclopentenyl ethers and have a low viscosity. But the reaction of dicyclopentadiene with glycols to form this intermediate is very difficult and time consuming.

PU-acrylates, polyurethane prepolymers, which are capped with ethylenically unsaturated end groups, are frequently used in acrylic systems and have a low shrinkage. The moderate-to-long chain prepolymers employed, comprise polyether-urethane or polyester-urethane derivatives formed by reacting a polyether or a polyester polyol with a diisocyanate. Polyether based PU-acrylates have low mechanical properties and temperature resistance. Polyester based PU-acrylates have a high viscosity or are crystalline at room temperature, and show poor compatibility to acrylic monomers.

It is also already known that acrylic ester monomers can be synthesized by direct esterification of (meth)acrylic acid with alcohols in the presence of an acid catalyst, a polymerization inhibitor, and an inert solvent to azeotrope the water formed during reaction. Several syntheses that use polyols as the alcohol component have also been reported. In general, all described processes for the synthesis of acrylic ester monomers from (meth)acrylic acid have the following limitations: 1. use of high cost raw materials and 2. production processes requiring expensive and time consuming reaction work up and product purification.

U.S. Pat. No. 3,645,984 reports the preparation of acrylic ester monomers by reacting a diol with (meth)acrylic acid or their anhydrides or acid chlorides. In EP 0 519 410 A2 aromatic polyether alcohols, prepared from aromatic alcohols and ethylene oxide or propylene oxide, are reacted with (meth)acrylic acid to yield novel acrylic ester monomers. In both patent documents, after the esterification has finished, the unreacted (meth)acrylic acid and catalyst are neutralized and the mixtures are washed several times with aqueous solutions. Then, the inert solvent is removed and the acrylic ester monomers are purified by extraction or distillation to separate them from side products and polymerization inhibitor. Besides being time consuming, the washing steps and (meth)acrylate purification cause considerable product loss decreasing the yield of the process.

EP 0 126 341 A2 and EP 0 921 168 A1 report processes for the synthesis of (meth)acrylic ester monomers by direct esterification of (meth)acrylic acid with polyester and/or polyether alcohols and polyols, and subsequent reaction with epoxies. According to these documents, the washing steps and purification of end products are avoided by reacting with epoxies the (meth)acrylic acid remaining in the mixture after esterification. For this purpose, after the esterification has finished, the inert solvent is removed and the esterification catalyst is neutralized. Then, an epoxy amount corresponding to the equivalent acid content of the mixture is added and the reaction is carried out at about 100° C. in the presence of a suitable catalyst. Though the end products can be obtained in high yields and can be further used without purification, the reaction with epoxies implies an additional process step. The high temperatures needed for the reaction could also lead to polymerization of the synthesized (meth)acrylates. For the reaction with epoxies, the reaction mixtures must contain a certain amount of (meth) acrylic acid, and, therefore, the direct esterification has to be achieved in the presence of (meth)acrylic acid excess, or additional acid has to be added after esterification.

It is furthermore already known that PET can be used as starting material for the production of polyester polyols useful in reactive polyurethanes compositions. E.g. U.S. Pat. No. 4,048,104 relates to polyisocyanate prepolymers, prepared from PET digestion products, which are usable in polyurethane elastomers, adhesives and foams. PU-foams with increased physical strength properties are prepared in U.S. Pat. No. 4,223,068 and U.S. Pat. No. 4,417,001 by replacing a certain amount of the reactive polyol component with a digestion product of PET. Polyester polyol compositions obtained from PET show partial crystallization, which lead to low storage stability of the mixtures. EP 0798 325 A1 reports polyhydroxy compounds from PET with increased chemical compatibility, which are suitable for polyurethane syntheses.

Non-reactive hot melts and/or pressure-sensitive adhesives have also been prepared using PET based polyester polyols. U.S. Pat. No. 5,008,366 and U.S. Pat. No. 3,993,629 disclose polyester based compositions using polyesters obtained from PET. An adhesive or coating composition that comprises a reaction product of PET polyester with a difunctional organic acid is reported in WO 95/21213.

EP 0 558 905 A1 describes the preparation of non-reactive, physically drying aqueous coating compositions from (optionally waste) PET. The polyethylene terephthalate is first reacted with an alcohol and then with carboxylic acids or their anhydrides to form low-molecular-weight polyesters, which can be further subjected to direct acrylic modification. Direct acrylic modification is typically conducted under conditions described in U.S. Pat. No. 4,735,995 and U.S. Pat. No. 4,873,281. The low-molecular-weight polyesters that may contain reactive double bonds are reacted in the presence of organic solvents and ethylenically unsaturated vinyl monomers after a free radical polymerization. Direct acrylic modification means in this case copolymerization with acrylic monomers and not functionalization of the polyester to obtain polymerizable acrylic ester monomers for radically curing acrylic systems.

SUMMARY OF THE INVENTION

Hence, it was a general object of the present invention to provide low-cost and low-odor (meth)acrylic ester binders which can be used as reactive components for reactive acrylic systems, particularly for adhesives, coatings, floorings, mortars, and casting compounds with enhanced mechanical properties, and that—besides of fulfilling the technical requirements of acrylic systems for industrial applications—are, from the economical and ecological point of view, preferably superior to already commercially available (meth)acrylic ester monomers. Other objects of the present invention are a method for the production of respective binders and their use.

Now, in order to implement these and still further objects of the invention, which will become more readily apparent as the description proceeds, the (meth)acrylic ester binders of the present invention are manifested by the features that they are mixtures of oligomers, said oligomers comprising those of the following formula

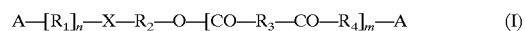
$$A-[R_1]_n-X-R_2-O-[CO-R_3-CO-R_4]_m-A \quad (I)$$

and/or

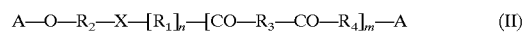
$$A-O-R_2-X-[R_1]_n-[CO-R_3-CO-R_4]_m-A \quad (II)$$

wherein A represents

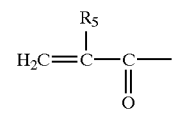

CO is carbonyl group $R_1$ is a repetition unit of an aromatic polyester, in particular a repetition unit of PET and/or PEN, $R_2$ is a divalent radical selected from the group consisting of optionally substituted linear and branched $C_3-C_{20}$ alkylen, cycloalkylen and aralkylen radicals, optionally substituted di-, tri- or tetraalkylenether radicals, and optionally substituted heterocyclic radicals, preferably such radicals derived from the alcohols or aminoalcohols mentioned above, whereby said substituents are preferably selected from the group consisting of hydroxy groups, ester groups and alkyl group, $R_3$ is a divalent radical selected from the group consisting of optionally OH or COOH substituted linear and branched aliphatic and aromatic and aralyphatic radicals, in particular radicals with 3 to 14 C atoms $R_4$=—O—$R_2$—X—$[R_1]$n— or —$[R_1]$n-X—$R_2$—O— or —X—$R_2$—O—

$R_5$ is hydrogen or methyl group

X is —O— or —NH—, and n is 1 to 4, and m is 0 to 3.

The binders of the invention may contain, besides oligomers of formula (I) and/or (II), at least one compound which is selected from the group comprising

A—O—$R_2$—X—A

A—$[R_1]_n$—O—$R_6$

A—OH wherein A, $R_1$ and $R_2$ are as defined above $R_6$ is a linear or branched aliphatic or aromatic or aralyphatic radical in particular a radical with 5 to 22 C-atoms.

A specific example of a non-modified binder molecule is shown below.

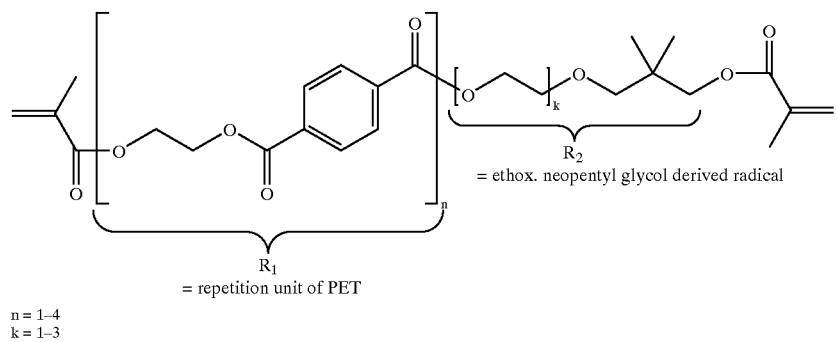

$R_1$ = repetition unit of PET
$R_2$ = ethox. neopentyl glycol derived radical n = 1–4
k = 1–3

Preferred binders are those that are obtainable from glycolyzed aromatic polyester such as polyethylene terephthalate (PET). These binders are suitable as reactive components for reactive acrylic systems, more specifically for adhesive, coating and flooring compositions with:

excellent mechanical properties, such as high tensile strength, high compressive strength and high scratch resistance, good weather and chemical resistance.

The (meth)acrylic ester binders of the present invention can be prepared by reacting polyesters containing free OH-groups with acrylic and/or methacrylic acid. The OH-terminated polyesters preferably are products of the reaction of high-molecular-weight aromatic polyesters such as PET with aromatic or aliphatic polyols and/or aminoalcohols.

The binders of the present invention—as they result from the reaction—are mixtures of molecules comprising PET fragments of generally 1 to 4 PET units, preferably 1 to 3 PET units.

The binders of the present invention can be present as such, or in compositions with other (meth)acrylates or ethylenically unsaturated vinyl monomers, or in formulations comprising at least one of the following further substances, namely catalysts, stabilizers, initiators, organic fillers, inorganic fillers, additives, toughening agents, adhesion promoters, defoaming agents, thickeners, thixotropic agents, plasticizers, wetting agents, wax compounds, cross-linking agents, inhibitors etc. Such additional substances are known to the skilled person and comprise e.g. as catalyst: N,N-dimethyl-p-toluidine, N-ethoxylated p-toluidine, N-alkylmorpholine; as inhibitor: hydrochinone, methylhydrochinon, t-butyl-p-cresol; as initiator: benzoylperoxide.

DETAILED DESCRIPTION OF THE PREFERRED EMBODIMENTS

The (meth)acrylic ester oligomers of the present invention are preparable from high-molecular-weight aromatic polyesters such as polyethylene naphthalate (PEN), polyethylene terephthalate (PET) or mixtures thereof. PET sources are either virgin or recycled PET, or waste PET from many sources such as beverage bottles, sheets, film and synthetic fibers.

The (meth)acrylic ester oligomers of the invention contain PET amounts within the range of about 10 to 80 wt. %; a more preferred range is from about 20 to 50 wt. %; especially preferred 30 to 40 wt. %. Preferably, PET should be flaked and washed before use, but the direct use of waste beverage bottles is possible.

The also inventive synthesis of the (meth)acrylic ester oligomers is based on a two-step process, but the steps can be achieved consecutively in a one pot reaction. The steps of the process consist in:

(i) generation of hydroxy terminated binder precursor oligomers (OH-precursors) said generation involving a glycolysis or similar reaction of aromatic polyester(s) such as PET and (ii) direct esterification of (meth)acrylic acid with said OH-precursors.

In the scope of the present invention, the product of step (i) that is further reacted in step (ii) is termed "hydroxy terminated binder precursor oligomers" or—shorter—"OH-precursors" since it usually is a mixture of OH-terminated oligomers. Said term comprises—dependent on whether or not a modification (chain extension) is performed—the "glycolysis" product (hydroxy terminated oligomer) or the reaction product of said "glycolysis" product with dicarboxylic acid(s) and/or anhydride(s). The term "glycolysis" for simplification is considered as also comprising the reaction with aminoalcohols.

The synthesis is now further described for the preferred polyester PET, however, it is also applicable to other aromatic polyesters.

(i) Generation of OH-Terminated Binder Precursor Oligomers (Glycolysis of PET)

In accordance with the present invention, PET is first reacted with a polyol or polyol mixture in molar ratios of 0.2 (OH groups in polyol):1 (repetition unit in PET) to 2 (OH groups in polyol):1 (repetition unit in PET) in the presence of an esterification catalyst to yield low-molecular-weight polyesters containing free OH-groups. Particularly favorable are mixture in molar ratios of 0.8 (OH-groups in polyol):1 (repetition unit in PET) to 1.5 (OH groups in polyol):1 (repetition unit in PET), and even more favorable 1.1 (OH groups in polyol):1 (repetition unit in PET) to 1.3 (OH groups in polyol):1 (repetition unit in PET). The reaction requires normally 0.5 to 4 hours at temperatures between 210° C. and 250° C., and it is preferably carried out under a $N_2$ atmosphere.

The polyols used for the glycolysis can be aliphatic, cycloaliphatic, aromatic and/or heterocyclic polyols, and are preferably selected from diols or triols. Examples of suitable polyols are diethylene glycol, triethylene glycol, tetraethylene glycol, tripropylene glycol, 1,4-butanediol, 1,6-hexanediol, glycerin, dipropylene glycol, neopentyl glycol, 2,2,4-trimethyl-1,3-pentane diol, 1,2-propane glycol, 1,3-propane glycol, 1,3-butane glycol, 2,3-butane glycol, 1,5- pentanediol, 2-methyl-1,5-pentanediol, 2-methyl-2-ethyl-1,3-propanediol, bisphenol-A-ethoxylate, dodecahydro-bisphenol-A, dimethylol propionic acid, OH-terminated polybutadiene, trimethylolethane, 1,4-cyclohexanedimethanol, 1,2-cyclohexanedimethanol, 1,3-cyclohexanedimethanol, 1,4-bis(2-hydroxyethoxy)cyclohexane, norbornylene glycol, 1,4-benzenediethanol, 2,4-dimethyl-2-ethylenehexane-1,3-diol, 2-buten-1,4-diol, ethoxylated trimethylolpropane, trimethylolhexane, trimethylolpropane-monoallyether, 1,2,4-butanetriol, dipentaerythritol, pentaerythrite, dicyclopentadienedimethanol, ethoxylated neopentyl glycol, dimethylhydantoin glycol, ethoxylated dimethylhydantoin glycol, ethoxylated isocyanurate, and in particular di-(2-hydroxyethyl)-5,5-dimethylhydantoin, 1,3-dimethylol-5,5-dimethylhydantoin, tri-(2-hydroxyethyl)-isocyanurate, and hydroxyalkyl isocyanurates. The PET-glycolysis can also be achieved with a mixture of polyols or polyols and aminoalcohols such as diethanolamine, triethanolamine and triisopropanolamine. Instead of polyols, aminoalcohols or mixtures of aminoalcohols can also be used. It is preferred that linear glycols such as diethylene glycols etc. are used in combination with branched glycols to reduce the risk of crystallization.

As catalyst, 0.1 wt. % to 2 wt. % of any esterification catalyst such as tin(II)caprylate, cobalt acetate, mangan(II) acetate, calcium hydroxide, calcium formiate, sodium hydroxide, barium hydroxide, and organic tin and titan catalysts can be added. Preferably, t-butyl ortho titanate is used.

(ii) Direct Esterification of (Meth)Acrylic Acid

The OH-precursors obtainable by the glycolysis reaction (see above), and optionally the chain extension reaction (see below), are further reacted with (meth)acrylic acid (MAA) in molar ratios of 0.5 (acid group in MAA):1 (OH group in OH-precursor) to (acid groups in MAA):1 (OH groups in OH-precursor) at temperatures from 90° C. to 140° C. to yield low-odor (meth)acrylic ester binders. The reaction is generally carried out in the presence of 0.1 wt. % to 2 wt. % of an esterification catalyst such as p-toluene sulfonic acid, methane sulfonic acid, sulfuric acid, boron trifluoride or any acid esterification catalyst. To prevent polymerization during reaction, a free-radical inhibitor such as hydroquinone, methyl hydroquinone, t-butyl p-cresol, phenothiazine and the like may be added in amounts ranging from 0.1 wt. % to 1 wt. % based on the weight of MAA. An inert solvent can be used to azeotrope the water resulting from the esterification reaction. Examples of solvents that are particularly useful are hexane, pentane, cyclopentane, cyclohexane, benzene, toluene, xylene or mixtures thereof. The preferred solvent is toluene. The reaction mixture may contain from about 5 wt. % to 30 wt. % of the selected solvent. The reaction is run for 4 to 5 hours or until no more water is formed.

Modifications

The properties of the cured acrylic systems can be varied by modification of the (meth)acrylic ester binders. Following the glycolysis step, the OH-terminated low-molecular-weight polyesters can be reacted with at least one difunctional or multifuntional organic acid (and/or anhydride). The resultant polyester prepolymers yield, after direct esterification, methacrylic ester binders, which provide cured systems with special properties. Suitable organic acids (or anhydrides) are aliphatic and aromatic difunctional or multifunctional acids such as adipic acid, azelaic acid, phthalic acid or anhydride, isophthalic acid, dodecandicarboxylic acid, maleic acid or anhydride, trimellitic acid or anhydride and the like.

The same procedure as outlined above can also be used with other starting materials such as PEN instead of PET, acrylic acid instead of methacrylic acid and aminoalcohols instead of polyols or part of polyols. Furthermore, in order to achieve specific features it is of course also possible to use mixtures of starting materials such as mixtures of aromatic polyesters, mixtures of acrylic acid and methacrylic acid, mixtures of polyols or polyols and aminoalcohols, etc.

Curable acrylic systems for special applications can also be obtained by replacing a certain amount of the polyols by a monofunctional alcohol in the glycolysis step. The amount of monofunctional alcohol(s), or a mixture of monofunctional alcohol, depends on the desired end use of the acrylic system. Preferably, the monofunctional alcohol(s) replaces 1 to about 90 mol % of the diol or polyol or aminoalcohol. Suitable alcohols include the $C_5$–$C_{22}$ linear and branched saturated and unsaturated alcohols including, for example, 4-methyl-1-pentanol, hexanol, linoleoyl alcohol, benzyl alcohol, trimethylolpropane diallylether, allyl alcohol and nonanol. Other useful alcohols include the OH-functional polyethers, polyesters, polyurethanes, polycaprolactones, etc.

EXAMPLES

Example 1

Without Chemical Modification 475 g PET flakes from recycled beverage bottles, 520 g ethoxylated neopentyl glycol and 5 g t-butyl ortho titanate are charged into a reactor equipped with mechanical stirrer, temperature controller and condenser. The reaction mixture is heated for 2 hours at 240° C. under $N_2$ atmosphere. Then, the solution is allowed to cool until the reaction mixture has reached 130° C. and then 365 g toluene, 460 g methacrylic acid containing 0.2 g phenothiazine, and 15 g p-toluene sulfonic acid are added. The reactor is further equipped with a water separator and the reaction is carried out at the boiling temperature of the mixture (about 130° C.). The water produced is distilled off with the solvent and collected in the separator. The reaction is finished after about 4 hours, or when no more water is formed. Finally, the toluene is removed under reduced pressure. The mixture obtained has low viscosity and is cured at room temperature with 2 wt. % benzoylperoxide as initiator and 0.5 wt. % dimethylaniline as catalyst to provide systems with tensile strength (TS)>35 MPa, elongation at break of 9%, good scratch resistance and compressive strength, and excellent weather and chemical resistance.

Example 2

Without Chemical Modification 475 g PET flakes from recycled beverage bottles, 520 g ethoxylated neopentyl glycol and 5 g t-butyl ortho titanate are charged into a reactor equipped with mechanical stirrer, temperature controller and condenser. The reaction mixture is heated for 2 hours at 240° C. under $N_2$ atmosphere. Then, the solution is allowed to cool until the reaction mixture has reached 130° C. and then 459 g toluene, 836 g methacrylic acid containing 0.4 g phenothiazine, and 18 g p-toluene sulfonic acid are added. The reactor is further equipped with a water separator and the reaction is carried out at the boiling temperature of the mixture (about 130° C.). The water produced is distilled off with the solvent and collected in the separator. The reaction is finished after about 4 hours or when no more water is formed. Finally, the toluene is removed under reduced pressure. The mixture obtained has low viscosity and is cured at room temperature with 2 wt. % benzoylperoxide as initiator and 0.5 wt. % dimethylaniline as catalyst to provide systems with tensile strength (TS)>65 MPa, elongation at break of 4%, good scratch resistance and compressive strength, and excellent weather and chemical resistance.

Example 3

Without Chemical Modification 465 g PET flakes from recycled beverage bottles, a mixture of 300 g ethoxylated neopentyl glycol and 230 g nonanol N, and 5 g t-butyl ortho titanate are charged into a reactor equipped with mechanical stirrer, temperature controller and condenser. The reaction mixture is heated for 2 hours at 240° C. under $N_2$ atmosphere. Then, the solution is allowed to cool until the reaction mixture has reached 130° C. and then 454 g toluene, 815 g methacrylic acid containing 0.4 g phenothiazine, and 18 g p-toluene sulfonic acid are added. The reactor is further equipped with a water separator and the reaction is carried out at the boiling temperature of the mixture (about 130° C.). The water produced is distilled off with the solvent and collected in the separator. The reaction is finished after about 4 hours or when no more water is formed. Finally, the toluene is removed under reduced pressure. The mixture obtained has low viscosity and is cured at room temperature with 2 wt. % benzoylperoxide as initiator and 0.5 wt. % dimethylaniline as catalyst to provide systems with tensile strength (TS)>30 MPa, elongation at break of 4%, good scratch resistance and compressive strength, and excellent weather and chemical resistance.

Example 4

With Chemical Modification by Reaction with Phthalic Acid Anhydride 395 g PET flakes from recycled beverage bottles, 440 g diethylene glycol and 5 g t-butyl ortho titanate are charged into a reactor equipped with mechanical stirrer, temperature controller and an overhead condenser with receiver. The reaction mixture is heated for 2 hours at 240° C. under $N_2$ atmosphere. Then, the reactor is allowed to cool to 200° C. and 160 g phthalic acid anhydride are added. The mixture is kept at this temperature for about 2 hours and the water formed is collected in the receiver. Once no more water is formed, the solution is allowed to cool until the reaction mixture has reached 130° C., and then 378 g toluene, 513 g acrylic acid containing 0.3 g phenothiazine, and 15 g p-toluene sulfonic acid are added. The reactor is further equipped with a water separator and the reaction is carried out at the boiling temperature of the mixture (about 130° C.). The water produced is distilled off with the solvent and collected in the separator. The reaction is finished after about 4 hours or when no more water is formed. Finally, the toluene is removed under reduced pressure. The mixture obtained has low viscosity and is cured at room temperature with 2 wt. % benzoylperoxide as initiator and 0.5 wt. % dimethylaniline as catalyst to provide systems with tensile strength (TS)>35 MPa, elongation at break of 6%, good scratch resistance and compressive strength, and excellent weather and chemical resistance.

Example 5

With Chemical Modification by Reaction with Phthalic Acid Anhydride 395 g PET flakes from recycled beverage bottles, 364 g diethylene glycol and 3 g t-butyl ortho titanate are charged into a reactor equipped with mechanical stirrer, temperature controller and an overhead condenser with receiver. The reaction mixture is heated for 2 hours at 240° C. under $N_2$ atmosphere. Then, the reactor is allowed to cool to 200° C. and 237 g phthalic acid anhydride are added. The mixture is kept at this temperature for about 2 hours and the water formed is collected in the receiver. Once no more water is formed, the solution is allowed to cool until the reaction mixture has reached 130° C., and then 303 g toluene, 213 g methacrylic acid containing 0.1 g phenothiazine, and 12 g p-toluene sulfonic acid are added. The reactor is further equipped with a water separator and the reaction is carried out at the boiling temperature of the mixture (about 130° C.). The water produced is distilled off with the solvent and collected in the separator. The reaction is finished after about 4 hours or when no more water is formed. Finally, the toluene is removed under reduced pressure. The mixture obtained has low viscosity and is cured at room temperature with 2 wt. % benzoylperoxide as initiator and 0.5 wt. % dimethylaniline as catalyst to provide systems with tensile strength (TS)>12 MPa, elongation at break of 30%, good scratch resistance and compressive strength, and excellent weather and chemical resistance.

Example 6

With Chemical Modification by Reaction with TMAS Waste Stream 379 g PET flakes from recycled beverage bottles, 440 g diethylene glycol and 2 g t-butyl ortho titanate are charged into a reactor equipped with mechanical stirrer, temperature controller and an overhead condenser with receiver. The reaction mixture is heated for 2 hours at 240° C. under $N_2$ atmosphere. Then, the reactor is allowed to cool to 200° C. and 180 g TMAS (WS) are added. The mixture is kept at this temperature for about 2 hours and the water formed is collected in the receiver. Once no more water is formed, the solution is allowed to cool until the reaction mixture has reached 130° C., and then 392 g toluene, 566 g methacrylic acid containing 0.3 g phenothiazine, and 16 g p-toluene sulfonic acid are added. The reactor is further equipped with a water separator and the reaction is carried out at the boiling temperature of the mixture (about 130° C.). The water produced is distilled off with the solvent and collected in the separator. The reaction is finished after about 4 hours or when no more water is formed. Finally, the toluene is removed under reduced pressure. The mixture obtained has low viscosity and is cured at room temperature with 2 wt. % benzoylperoxide as initiator and 0.5 wt. % dimethylaniline as catalyst to provide systems with tensile strength (TS)>37 MPa, elongation at break of 8%, good scratch resistance and compressive strength, and excellent weather and chemical resistance.

While there are shown and described presently preferred embodiments of the invention, it is to be distinctly understood that the invention is not limited thereto but may be otherwise variously embodied and practised within the scope of the following claims.

What is claimed is:

1. Methacrylate or acrylate binder comprising oligomers of the following formula (I) and/or (II)

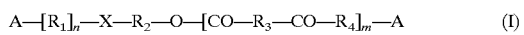

and/or

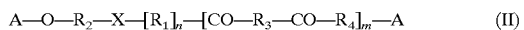

wherein A represents

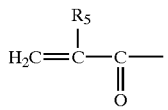

R$_1$ is a repetition unit of an aromatic polyester,

R$_2$ is a divalent radical selected from the group consisting of linear and branched C$_3$–C$_{20}$ alkylene, cycloalkylene and aralkylene radicals, di-, tri- or tetraalkylene ether radicals, and heterocyclic radicals, wherein said radicals may be optionally substituted, R$_3$ is a divalent radical selected from the group consisting of linear and branched aliphatic and aromatic and araliphatic radicals, wherein said radicals may be optionally substituted with OH or COOH groups, R$_4$=—O—R$_2$—X—[R$_1$]n— or —[R$_1$]n-X—R$_2$—O— or —X—R$_2$—O—

R$_5$ is hydrogen or methyl group

X is —O— or —NH—, and n is 1 to 4, and m is 0 to 3, wherein said binder is fanned by esterification of at least one hydroxy-terminated aromatic polyester oligomer with acrylic or methacrylic acid.

2. The binder of claim 1 that further comprises at least one compound selected from the group consisting of

A—O—R$_2$—X—A,

A—[R$_1$]n-O—R$_6$, and

A—OH, wherein A, R$_1$ and R$_2$ are as defined in claim 1, and

R$_6$ is a linear or branched aliphatic or aromatic or araliphatic radical.

3. The binder of claim 1 that comprises the oligomer represented by

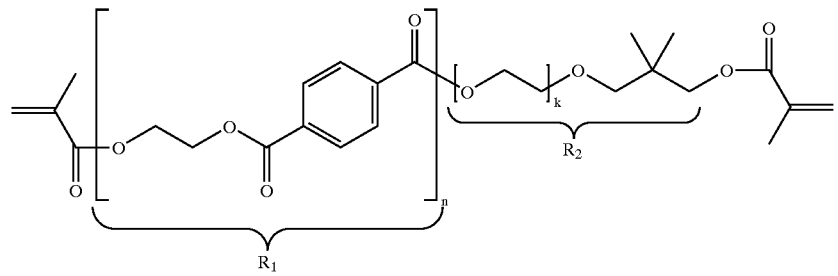

wherein R$_1$ is a repetition unit of PET,

R$_2$ is an ethoxylated neopentyl glycol derived radical, n is 1 to 4, and k is 1 to 3.

4. The binder of claim 1 that is obtained by the steps of (i) generating hydroxy terminated binder precursor oligomers (OH-precursors) derived from at least one aromatic polyester, and (ii) reacting said OH-precursors of step (i) with methacrylic acid and/or acrylic acid to form a respective ester, whereby step (i) comprises reacting an aromatic polyester, or a mixture of aromatic polyesters with at least one polyol and/or at least one aminopolyol to generate hydroxy terminated oligomers.

5. The binder of claim 1, which is a methacrylate binder.

6. The binder of claim 1, which is derived from PET.

7. The binder of claim 4, which is prepared using as polyol at least one diol, at least one triol or a mixture thereof.

8. The binder of claim 4, which is prepared using a mixture of at least one polyol and/or at least one aminoalcohol and at least one monofunctional alcohol.

9. The binder of claim 7, wherein the alcohol is selected from monohydroxy functional or dihydroxy functional polymers or oligomers selected from the group consisting of polyethers, polyesters, polyurethanes, polycaprolactones and mixtures thereof.

10. The binder of claim 4, wherein said OH-precursors of step (i) that are further reacted in step (ii) are identical with said hydroxy terminated oligomers.

11. The binder of claim 4, wherein said OH-precursors of step (i) that are further reacted in step (ii) are obtained by further reacting said hydroxy terminated oligomers with at least one polycarboxylic acid and/or at least one polycarboxylic anhydride.

12. The binder of claim 11, wherein the polycarboxylic acid is a dicarboxylic acid or an anhydride of a dicarboxylic acid.

13. Method for the production of a binder of claim 4 comprising the steps of (i) generating OH-precursors from at least one aromatic polyester, an (ii) reacting said OH-precursors of step (i) with methacrylic acid and/or acrylic acid to form a respective ester, whereby step (i) comprises reacting an aromatic polyester, or a mixture of aromatic polyesters with at least one polyol and/or at least one aminopolyol to generate hydroxy terminated oligomers.

14. The method of claim 13, wherein step (i) furthermore comprises reacting said hydroxy terminated oligomers with at least one polycarboxylic and/or at least one polycarboxylic anhydride to get said OH-precursors.

15. A composition of binders comprising binders of claim 1 and at least one other (meth)acrylate and/or ethylenically unsaturated vinyl monomer.

16. A formulation comprising a binder of claim 1 and at least one further substance selected from the group consisting of initiators, catalysts, stabilizer, binders different from a (meth)acrylate binder or ethylenically unsaturated vinyl monomer, fillers and additives.

17. The formulation of claim 16 that is an adhesive formulation, a coating formulation, a mortar formulation, a casting compound formulation or a flooring formulation.

18. An adhesive, coating, flooring, mortar, or casting compound comprising the binder of claim 1.

19. Method for producing a joint, coating or flooring, wherein a binder of claim 1 is applied on at least one substrate such that wetting and adhesion is achieved.

20. The binder of claim 1, wherein R$_2$ is optionally substituted with substituents selected from the group consisting of hydroxy, ester and alkyl groups.

21. The binder of claim 1, wherein $R_3$ is a radical with 3 to 14 carbon atoms.

22. The binder of claim 2, wherein $R_6$ is a radical with 5 to 22 carbon atoms.

23. The binder of claim 7, wherein said polyol is selected from the group consisting of diethylene glycol, ethoxylated neopentyl glycol, di-(2-hydroxyethyl)-5,5-dimethylhydantoin, 1,3-dimethylol-5,5-dimethylhydantoin, tri-(2-hydroxyethyl)-isocyanurate, hydroxyalkyl isocyanurates, and mixtures thereof.

24. The binder of claim 8, wherein said monofunctional alcohol is selected from the group consisting of $C_5$–$C_{22}$ linear saturated alcohols, $C_5$–$C_{22}$ linear unsaturated alcohols, $C_5$–$C_{22}$ branched saturated alcohols, $C_5$–$C_{22}$ branched unsaturated alcohols, and mixtures thereof.

25. The binder of claim 8, wherein said monofunctional alcohol is selected from the group consisting of 4-methyl-1-pentanol, hexanol, lynoleyl alcohol, benzyl alcohol, trimethylolpropane diallylether, allyl alcohol, nonanol, and mixtures thereof.

26. The binder of claim 12, wherein the dicarboxylic acid or anhydride is selected from the group consisting of adipic acid, azelaic acid, phthalic acid or anhydride, isophthalic acid, dodecandicarboxylic acid, maleic acid or anhydride and trimellitic acid or anhydride.

* * * * *